United States Patent [19]

Miller

[11] Patent Number: 5,673,235
[45] Date of Patent: Sep. 30, 1997

[54] SOCK SHAPED INTERNAL STRENGTH MEMBER FOR TOWED ARRAYS

[75] Inventor: Howard A. Miller, Encinitas, Calif.

[73] Assignee: The United States of America as represented by the Secretary of the Navy, Washington, D.C.

[21] Appl. No.: 81,813

[22] Filed: Jul. 30, 1987

[51] Int. Cl.$^6$ ................................................ G01V 1/38
[52] U.S. Cl. ........................ 367/20; 367/154; 174/101.5
[58] Field of Search ........................... 367/20, 154, 169; 174/101.5

[56] References Cited

U.S. PATENT DOCUMENTS

| 4,402,064 | 8/1983 | Miller et al. | 367/154 |
| 4,641,288 | 2/1987 | MGowen et al. | 367/20 |

*Primary Examiner*—J. Woodrow Eldred
*Attorney, Agent, or Firm*—Harvey Fendelman; Michael A. Kagan; Thomas Glenn Keough

[57] ABSTRACT

An elongate towed acoustic array is improved by the inclusion of a specifically configured tensile load bearing strength member disposed within a hose-shaped sheath. The member has a plurality of longitudinally extending high strength cords formed of braids or strands of high tensile strength fibers. The cords are held in a longitudinal juxtaposed relationship by a transverse weave to define a hollow interior for non-compressively containing sensor elements. Thusly configured, the strength member possess a softness and flexibility that does not create damage inducing crimps while not overly interfering with the sensors' acoustic sensing capabilities. The hose-shaped sheath contains the tubular-shaped strength member in a non-compressive relationship to reduce the problems normally associated with flow noise. The cords are braided together in an eye-splice where they are wrapped about towing pins so that the cords' tensile strength is not compromised at the point of attachment. Optionally, a twill weave is used to hold the longitudinal cords in their juxtaposed relationship to assure softness and flexibility for the wall of the strength member.

3 Claims, 3 Drawing Sheets

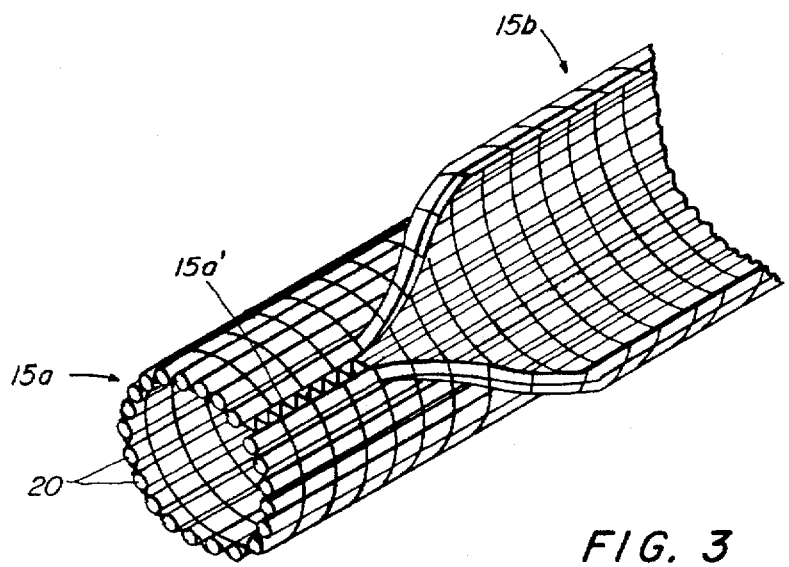
FIG. 3
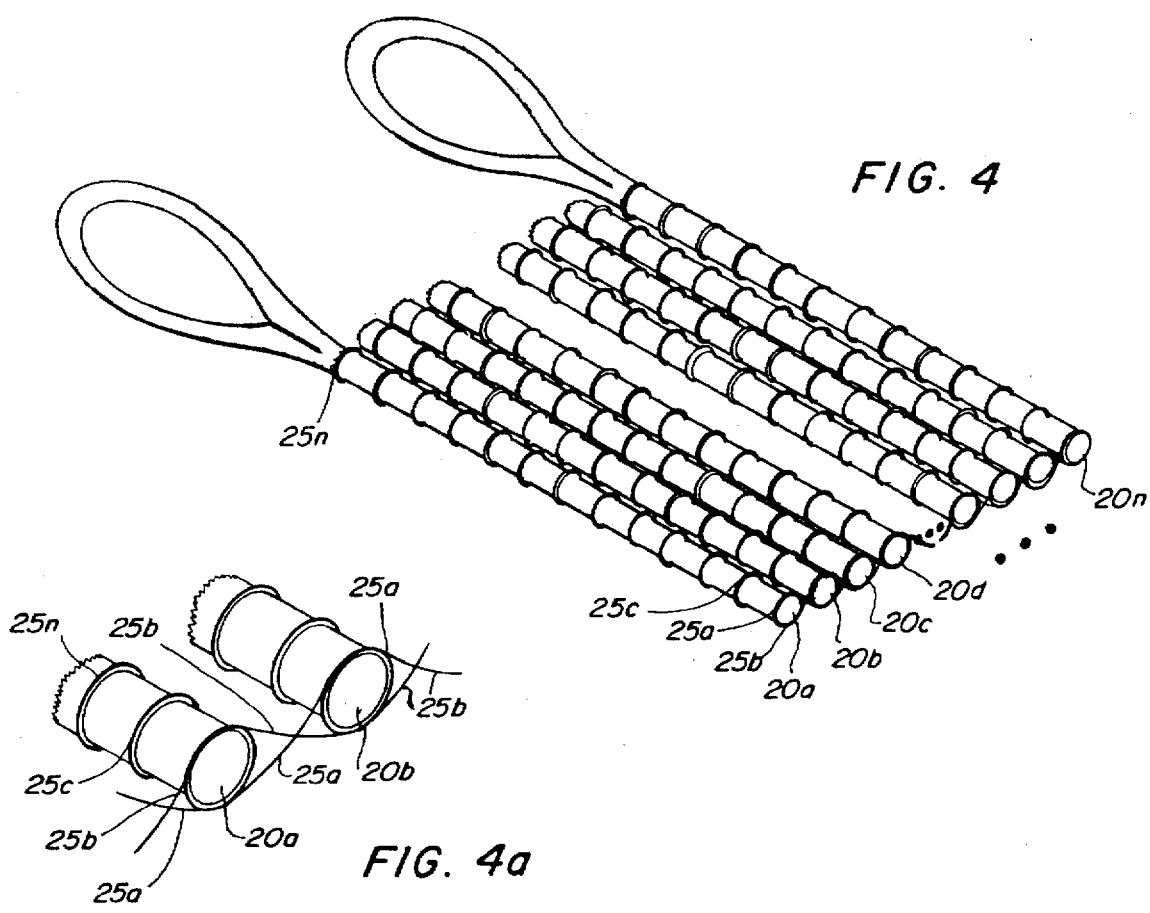
FIG. 4
FIG. 4a

SOCK SHAPED INTERNAL STRENGTH MEMBER FOR TOWED ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Towed arrays often are relied upon for the acoustic sensing of ambient phenomena in the ocean. Typically, they are elongate arrays that have a number of sensor elements along with their associated electronics and control leads contained within a hose-shaped structure that extends some distance through the water. Since they are towed by a submerged or surface craft, most designs have load bearing members incorporated in the array hosewall during manufacture. These designs may not work well for extremely long arrays as there is an insufficient cross-section available in the hosewall to accommodate the needed strength members for bearing the increased tensile load. As a consequence, fairly large diametered strength members have been included inside of the hosewall to bear the increase load. A disadvantage of this approach is that the relatively large diametered strength members take up an inordinate amount of the available space inside the hosewall. Another drawback is that these strength members squeeze and crush the electronic sensors and relatively fragile interconnections when the array is bent as it passes over a sheave (the internal strength members displace and pinch and pull wiring apart as the array restraightens as comes off a sheave). The large internal strength members also tend to compromise the effectiveness of the sensors and electronics. Carrying the electronics and sensors in an additional elongate sleeve within the hose-shaped structure has somewhat improved performance but still, room for improvement remains.

Thus there is a continuing need in the state-of-the-art for an improvement to a towed array in which the load members do not overly compromise the array's acoustic performance and which does not induce excessive stresses and strains while the array is being deployed and retrieved.

SUMMARY OF THE INVENTION

The present invention is directed to providing an improvement for an elongate array of acoustic sensors and their associated electronics contained in a hose-like sheath for tensilely bearing the imposed load. A plurality of longitudinally extending juxtaposed cords fabricated from high tensile strength fibers are held in a side-by-side relationship by an appropriate weave that assures sufficient flexibility. Dimensioning the juxtaposed cords and weave in the shape of a thin walled strength member defines a space for non-compressively containing the sensors and electronics to allow responsive sensing. Fitting the thin walled strength member within a protuberance free sheath and securing by forming eye-splices of the cords of the strength member about anchoring pins assures uncompromised tensile strength for long term reliability.

A prime object of the invention is to provide an improvement for hose-shaped towed arrays.

Another object is to provide for an improved strength member for a hose-like towed array.

Another object is to provide for an improved strength member in a hose-like array that does not overly compromise acoustic performance.

A further object of the invention is to provide for an improved strength member in a hose-like array that reduces failure inducing strains as the array is being deployed and retrieved.

Still another object of the invention is to provide for an improved strength member of a hose-like acoustic array having eye-splices formed of longitudinal cords that retain the cords' tensile strength.

Still yet a further object of the invention is to provide for an improved strength member for a towed array having small diameter cords to allow small diameter radius pins for the termination thereof.

Still yet a further object of the invention is to provide for an improved strength member formed of a plurality of juxtaposed cords held adjacent one another by a twill weave to provide a proper hand, or softness, of the strength member.

These and other objects of the invention will become more readily apparent from the ensuing specification when taken with the appended claims in conjunction with the attached drawings.

BRIEF DESCRIPTION OF THE DRAWINGS

FIG. 3 shows an isometric depiction of the strength member of this invention partially in its "sock-shape" and partially flattened.

FIG. 4 depicts a flattened strength member with cords eye-spliced on themselves in termination loops.

FIG. 4a is a detailed depiction of one design for a weave interconnecting the cords.

DESCRIPTION OF THE PREFERRED EMBODIMENT

Figure 1:
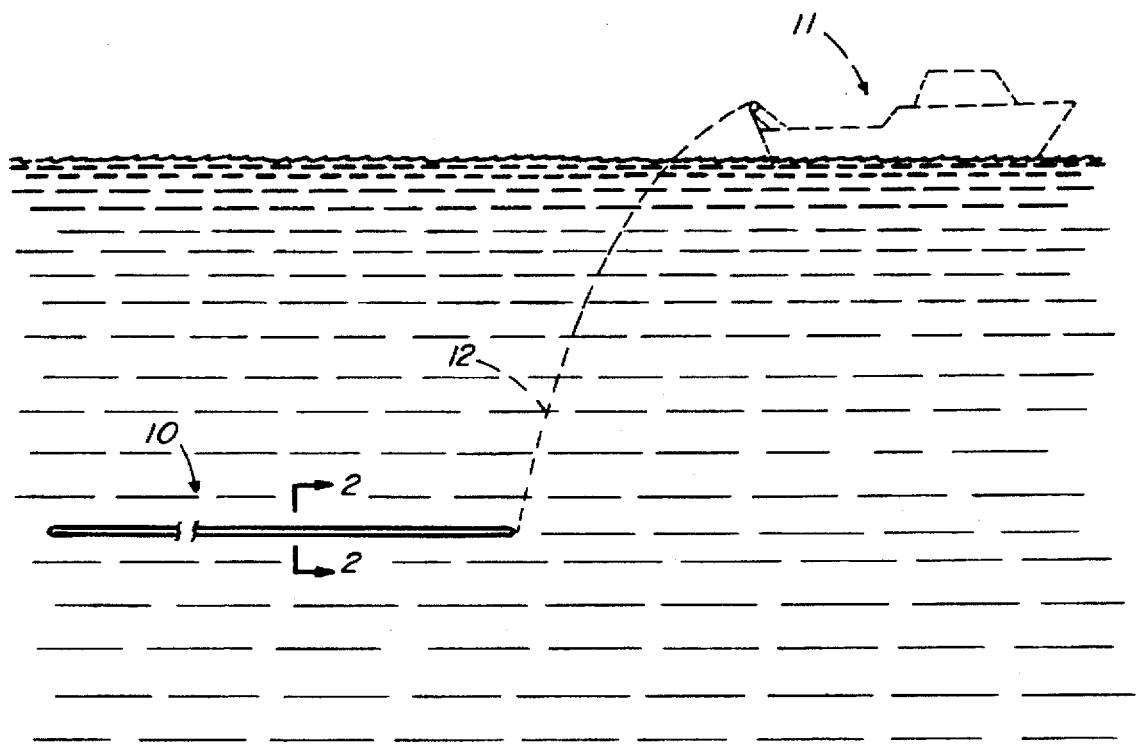
FIG. 1 is an isometric depiction of long line towed array operationally disposed.

Referring to FIG. 1 of the drawings an elongate towed array 10 is operationally deployed behind a towing vessel 11 via a towing cable 12. Acoustic arrays are many and varied in design and purpose for sensing an ambient phenomena such as acoustic pressure. Their hose-like dimensions have increased in length over the years to make them better receptors of the monitored information; at the same time, diameters have been reduced. As the lengths grow longer, more capable load bearing members need be incorporated to withstand the increased drag created as the longer length arrays are pulled through the water.

Figure 2:
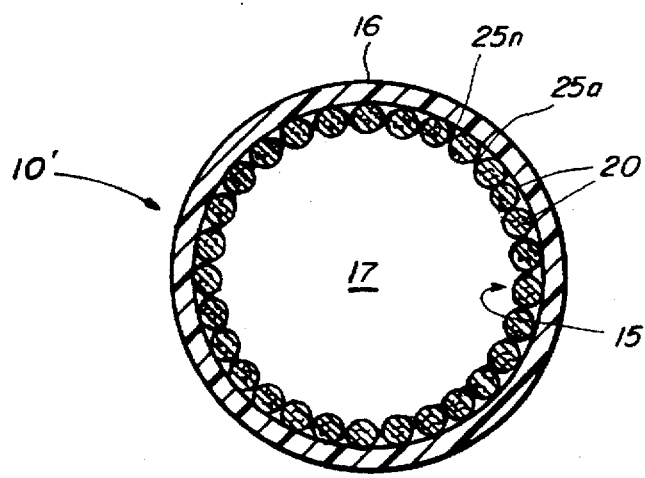
FIG. 2 shows a cross-sectional view of the array generally taken along lines 2—2 in FIG. 1.

Looking now to FIG. 2 a typical modified array 10' includes an improved load bearing member 15 having a capability for bearing increased tensile load. An outer sheath 16 has been fitted about the load bearing member in non-compressive relationship to present a streamlined outer configuration that reduces the problems normally associated with excessive flow noise. An elongate electronics and sensor filled chamber 17 is defined within the internal dimensions of the strength member to contain the sensors, supporting electronics and necessary power and data carrying leads for the array. This chamber extends the length of the array so that the sensors, electronics, cable, etc. can be longitudinally, suitably disposed along the length of the hose-like array. The location and frequency of the elements to accomplish the desired acoustic sensing operation will vary to accommodate the task at hand. The internal chamber usually is filled with a non-compressive filler material such as oil, or can be pressurized so that the overall structure of the towed array maintains an elongate hose-like shape.

Improved strength bearing member 15 is fabricated so as not to exert any compressive loading on the elements contained in chamber 17. Preferably, the transducers electronics, etc. are fitted within the internal dimensions of the strength member with minimum of slack.

FIG. 3 has the strength member shown partially in a sock-like configuration 15a that is sewn together along a seam 15a' and partially in a flatten shape 15b. Also noting FIGS. 4 and 4a, a plurality of elongate cords 20 are arranged in an equidistantly spaced, juxtaposed longitudinal extension that runs the length of the strength member along the array.

In a preferred embodiment, each of the cords is formed of 8 ends of yarn which are braided together. The braid of each cord is made to have two picks per inch to reduce the elongation of the finished strength member (a pick is where two ends cross). It has been found that if there are more picks per inch, there are more overlapping or X-braided ends and consequently, more elongation or stretch when the strength member is under tensile load. One of the advantageous features of this improved strength member is that excessive stretch is avoided, where possible, to improve the operation of the sensor elements.

While braids of ends of yarn have been described thus far, it is well within the purview in one skilled in the art to which this invention pertains to have the many strands of each cord running the entire length of any array without being braided. The strands, of course, would be gathered in ends. In a design found to be suitable for its intended application 8 ends of an aramid fiber such as that marketed under the trademark Kevlar were fashioned in a 1/1 braid for each cord. Other fibers, such as polyethylene marketed under the trademark Spectra might be used. Others can be selected. Each of the ends contained 3000 denier braided 1/1 in a single braid. Such a configuration assures a relatively thin wall design for the strength member that does not overly compromise the acoustic sensing capabilities of the sensor elements.

The overall number and dimensions of the cords used are specifically tailored to the diameter of the sensors and electronic elements being contained so that they are contained without the cords' exerting a compressive force on them. A desired hand or softness in the strength member is assured by the weaving which holds adjacent cords together.

Figure 5:
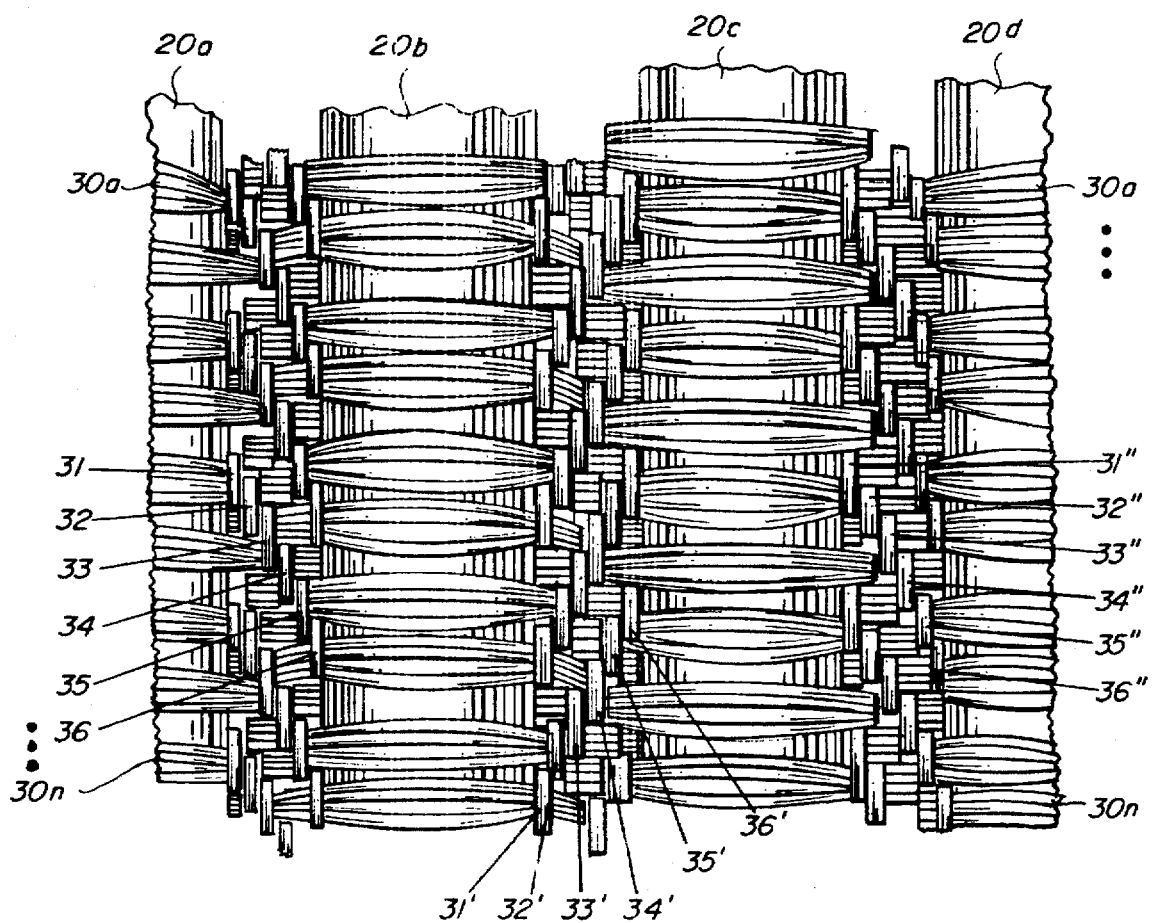
FIG. 5 shows in detail a portion of the cords and fill woven together in a twill pattern to help assure a more acceptable hand for the strength member.

Cords 20 are held in their longitudinally extending side-by-side relationship by being woven together with polyester fills, note FIGS. 4a and 5. An over/under weave of polyester fills is shown in FIG. 4a. Fill 25a goes over first cord 20a, under its adjacent cord 20b, over the next cord 20c, under the next cord 20d, and so on. Fill 25b goes under, then over and so on. These and alternating fills 25c–25n were adequate to shape the longitudinally extending cords in a tube-like shape when it was sewn together with a seam as referred to with respect to 15a' above. The side-by-side longitudinally extending cords and the over-and-under wrap of the polyester fills helped alleviate some of the problems of the state-of-the-art, but still was not satisfactory. This weave was found to create an unduly stiff strength member. This stiffness created kinking in the reeled array that crushed the sensor elements. Also, a relatively rigid surface was created that tended to over stress the sensing elements when the array passed over a sheave during deployment and retrieval.

A preferred weave for the cords 20a–20n is shown in FIG. 5, this twill weave is woven between adjacent cords. Fills 30a–30n each include four ends of polyester per fill and are provided to laterally reach across the cords and be woven of polyester in a successively staggering twill design that alternates between adjacent cords. Six warp ends 31, 32, 33, 34, 35 and 36 are woven with the fills between adjacent cords 20a and 20b. Other warp ends 31', 32', 33', 34', 35', 36' and warp ends 31", 32", 33", 34", 35" and 36" are woven in the staggered, alternately reversed twill pattern between cords 20b and 20c and cords 20e and 20d respectively in the example of FIG. 5.

This well known weave design was incorporated in this strength member to give structure with an acceptable hand for the strength member. This design allowed a degree of softness and handling which did not unduly create failure inducing stresses nor overly interfere with the array's acoustic properties.

FIG. 4 shows cords braided back on themselves in eye-splices to form termination loops 40a–40n . . . . This termination scheme does not comprise the strength of the cords as might contemporary clamping arrangements. The eye-splice termination loops are wrapped about pins (not shown) which are connected to another array or a towing cable or a drogue chute. The dimensions of the pins are small since they too may have to be contained in the hose-like sheath. The braided interconnection of the cords can accommodate the small diametered pins without creating a "weakest link" part of the composite cord structure. The loops may all be the same length to engage a single pin if desired or have different lengths to engage a number of appropriately spaced pins.

Obviously, many modifications and variations of the present invention are possible in the light of the above teachings. It is therefore to be understood that within the scope of the appended claims the invention may be practiced otherwise than as specifically described.

I claim:

1. An apparatus for providing tensile strength for an elongate array of sensors and their associated electronics contained in a hose-like sheath comprising:

means disposed contiguously adjacent to and on the inside of the sheath for longitudinally extending the length thereof, the longitudinally extending means reaches from one end of the sheath to the other, and defining a contained elongate chamber therein sized to contain at least one sensor and associated electronics in a non-compressive relationship, the longitudinally extending means is fabricated to provide longitudinal tensile strength capabilities uniformly about the elongate chamber and the longitudinally extending means is a plurality of cords made from a number of ends of an aramid fiber arranged in a juxtaposed relationship with respect to one another on the inner wall of the hose-like sheath in an equidistantly spaced relationship;

means disposed coextensively along the longitudinally extending means for providing structure to position it so that the longitudinal tensile strength capability is assured; and means formed at at least one end of the longitudinally extending means for braiding back onto itself to assure securing to a towing vessel, the structure providing means is a weave of lateral fills woven among the cords of aramid fiber.

2. An apparatus according to claim 1 in which the structure providing means is fashioned in an alternating staggered twill weave between alternate adjacent cords of aramid fiber.

3. An apparatus according to claim 2 in which the braiding means is each cord eye-spliced on itself in termination loops that engage towing pins.

* * * * *